E. A. FRANTZ.
BALE TIE BUCKLE.
APPLICATION FILED APR. 17, 1916.
1,219,283.
Patented Mar. 13, 1917.
FIG_1_
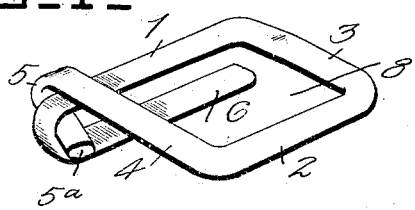
FIG_2_
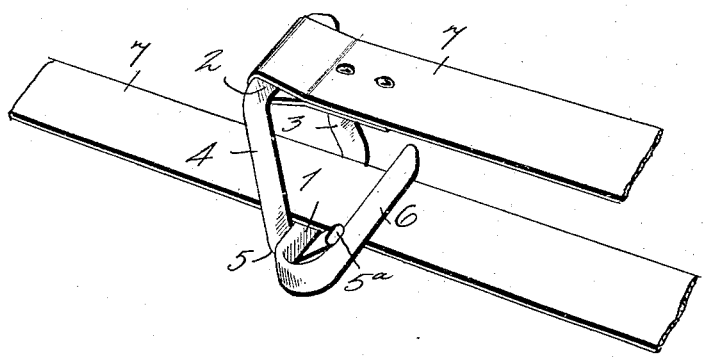
FIG_3
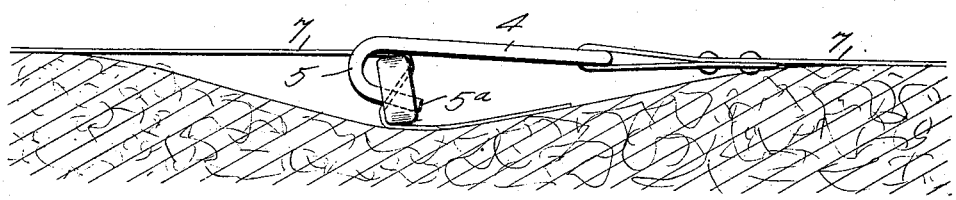
FIG_4_
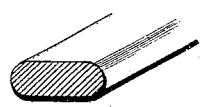
FIG_5_
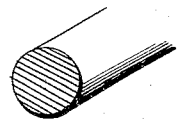
WITNESSES:
John N. Phelps Jr.
H. E. Beck
INVENTOR
EZRA A. FRANTZ,
BY
ATTORNEYS

UNITED STATES PATENT OFFICE.

EZRA A. FRANTZ, OF WEATHERFORD, TEXAS, ASSIGNOR TO FRANTZ STANDARD BUCKLE CO., OF WEATHERFORD, TEXAS, A CORPORATION OF TEXAS.

BALE-TIE BUCKLE.

1,219,283.  Specification of Letters Patent.  Patented Mar. 13, 1917.

Application filed April 17, 1916. Serial No. 91,596.

*To all whom it may concern:*

Be it known that I, EZRA A. FRANTZ, a citizen of the United States, and a resident of Weatherford, in the county of Parker and State of Texas, have invented a certain new and useful Improvement in Bale-Tie Buckles, of which the following is a specification.

My invention relates to improvements in bale tie buckles, especially in those designed to be used on bales of cotton or the like, and it consists in the combinations, constructions, and arrangements herein described and claimed.

An object of my invention is to provide a buckle made of a single length of wire which has the advantage that the bale band may be reeved through the buckle and can be drawn up tight around the bale before the pressure on the bale is released.

A further object of my invention is to provide a buckle which eliminates the creeping of the bale band that usually occurs with the ordinary wire buckle.

A further object of my invention is to provide a wire bale tie or buckle in which the wire is made flat or oval, this making a sharper bend in the bale band and hence decreasing the liability of slipping.

Other objects and advantages will appear in the following specification, and the novel features of the invention will be particularly pointed out in the appended claim.

My invention is illustrated in the accompanying drawings forming part of this application, in which—

Figure 1 is a perspective view of the tie or buckle.

Fig. 2 is a view showing the position of the buckle when the band is being raised through the same.

Fig. 3 shows the position of the buckle when tension comes on the bend.

Fig. 4 is a sectional view showing a portion of a flat wire buckle, and

Fig. 5 is a view similar to Fig. 4, showing a modified form in which the wire is round in cross section.

Referring now particularly to Fig. 1, it will be seen that the buckle is composed of a single piece or length of wire. The general form of the buckle is that of an elongated rectangle having side portions 1 and 2 which are connected together by an end portion 3. The opposite end portion 4 is a continuation of one of the side portions 2, being provided at its end with a hook 5 which is bent around the side portion 1.

The side portion 1 is bent around the end $5^a$ of the hook and terminates in an arm 6 which arm is in a plane parallel with the side member 1, the end of the arm 6 terminating at a point approximately in a common plane with the end member 3. It will be observed that the end $5^a$ of the hook 5, bears on the arm 6.

From the foregoing description of the various parts of the buckle, the operation thereof may be readily understood. One end of the band 7 is secured to the arm 2. With the buckle now in the position shown in Fig. 2, the opposite end of the band 7 is reeved through the buckle by passing it through the central opening 8 and between the arms 6 and 1.

The band can now be drawn up tight around the bale. When the band is released, the strain will move the buckle into the position shown in Fig. 3, in which position the end of the band is firmly held because of the fact that there is a double bend, one around the arm 1 and the other around the arm 6. Furthermore, the arm 6 is forced against the bale by the leverage exerted by the band which tends to bring the arms 1 and 2 into alinement with the band itself. It will now be seen why the end $5^a$ of the hook 5 should preferably bear against the arm 6, because when the arm 2 is pulled toward the bale, the arm 6 is forced inwardly to engage the bale, not only by force transmitted through the arm 1 to which it is connected, but also by force transmitted through the end 4 and the hook 5, whose end $5^a$ bears against the arm 6.

I am aware that bale buckles have been made having a rectangular loop with an arm parallel to one side of the loop. There are, however, no devices of which I am aware in which the hooks 5, or rather, the end 4 which merges into the hook 5, passes the arm 1 on the side of the arm away from the arm 6, and in which the point of the hook bears against the arm 6 so as to exert a leverage on the latter. Furthermore, the devices do not operate the same way that mine operates, and cannot so operate on account of other differences in structure.

Another reason for making the buckle which forms the subject of the present invention particularly efficient, is the fact that I prefer to make it out of flat wire which, besides giving the double bend already referred to, makes the bend sharper so that a firmer grip on the bale band is had. Of course the flat wire might be used on a tuck buckle or other form of buckle, in which a bend is made in the bale band, and would make a sharper bend as with the buckle of the present application. The double bend in the band will insure the holding of the band even though the latter should not have a firm bearing against the bale.

I claim:—

A bale tie buckle composed of a single length of flat wire having parallel side portions, a connecting end portion, one of said end portions being bent at its end into curved form, an arm forming a continuation of said curved portion, said arm and curved portion being in a common plane extending at right angles to the plane through the side portion, the other of said side portions being bent laterally to form an end portion parallel with the opposite end portion, said end portion being shorter than said side portions and being substantially in the same plane with the side portions, said laterally bent end portion being curved to form a hook partly encircling the curved end of one of said side portions and the end of said hook being disposed between the side portions of the parallel arm and arranged to engage the latter.

EZRA A. FRANTZ.

Witnesses:
J. O. TUCKER,
J. P. OWENS.

Copies of this patent may be obtained for five cents each, by addressing the "Commissioner of Patents, Washington, D. C."